(12) United States Patent
Eickhoff

(10) Patent No.: US 9,799,899 B2
(45) Date of Patent: Oct. 24, 2017

(54) POWER GENERATOR WITH ADDITIONAL HYDROGEN STORAGE

(71) Applicant: Honeywell International Inc., Morristown, NJ (US)

(72) Inventor: Steven J. Eickhoff, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 587 days.

(21) Appl. No.: 14/045,690

(22) Filed: Oct. 3, 2013

(65) Prior Publication Data

US 2014/0106249 A1 Apr. 17, 2014

Related U.S. Application Data

(62) Division of application No. 11/789,520, filed on Apr. 25, 2007, now Pat. No. 8,551,663.

(51) Int. Cl.
*H01M 8/04082* (2016.01)
*H01M 8/065* (2016.01)

(52) U.S. Cl.
CPC ... *H01M 8/04216* (2013.01); *H01M 8/04201* (2013.01); *H01M 8/04208* (2013.01); *H01M 8/065* (2013.01)

(58) Field of Classification Search
None
See application file for complete search history.

(56) References Cited

U.S. PATENT DOCUMENTS

| | | | |
|---|---|---|---|
| 4,155,712 | A | 5/1979 | Taschek |
| 4,261,955 | A | 4/1981 | Bailey, Jr. et al. |
| 5,372,617 | A | 12/1994 | Kerrebrock et al. |
| 5,527,632 | A | 6/1996 | Gardner |
| 5,634,341 | A | 6/1997 | Klanchar et al. |
| 5,932,369 | A | 8/1999 | Komada et al. |
| 6,093,501 | A | 7/2000 | Werth |
| 6,280,865 | B1 | 8/2001 | Eisman et al. |
| 6,432,566 | B1 | 8/2002 | Condit et al. |
| 6,586,124 | B2 | 7/2003 | Kelley et al. |

(Continued)

FOREIGN PATENT DOCUMENTS

| | | |
|---|---|---|
| DE | 19941085 A1 | 3/2001 |
| DE | 102004061286 A1 | 6/2006 |

(Continued)

OTHER PUBLICATIONS

"U.S. Appl. No. 11/789,520, Advisory Action mailed Aug. 25, 2010", 3 pgs.

(Continued)

*Primary Examiner* — Sarah A Slifka
(74) *Attorney, Agent, or Firm* — Schwegman Lundberg & Woessner, P.A.

(57) ABSTRACT

A power generator includes a hydrogen producing fuel and a hydrogen storage element. A fuel cell having a proton exchange membrane separates the hydrogen producing fuel from ambient. A valve is positioned between the hydrogen storage element and the hydrogen producing fuel and the fuel cell. Hydrogen is provided to the fuel cell from the hydrogen storage element if demand for electricity exceeds the hydrogen producing capacity of the hydrogen producing fuel.

16 Claims, 2 Drawing Sheets

(56) References Cited

U.S. PATENT DOCUMENTS

| | | | |
|---|---|---|---|
| 7,556,660 | B2 | 7/2009 | Shurtleff et al. |
| 8,551,663 | B2 | 10/2013 | Eickhoff |
| 2002/0182459 | A1 | 12/2002 | Hockaday et al. |
| 2003/0207175 | A1 | 11/2003 | Ovshinsky et al. |
| 2003/0228252 | A1 | 12/2003 | Shurtleff |
| 2005/0079129 | A1 | 4/2005 | Venkatesan et al. |
| 2005/0106097 | A1 | 5/2005 | Graham et al. |
| 2005/0112018 | A1 | 5/2005 | Schulz et al. |
| 2005/0238810 | A1 | 10/2005 | Scaringe et al. |
| 2006/0101943 | A1 | 5/2006 | Snow et al. |
| 2006/0292065 | A1 | 12/2006 | Wolverton et al. |
| 2007/0031325 | A1 | 2/2007 | Carruthers et al. |
| 2007/0104996 | A1* | 5/2007 | Eickhoff ............. C01B 3/065 429/417 |
| 2007/0237995 | A1 | 10/2007 | Eickhoff et al. |
| 2008/0241613 | A1 | 10/2008 | Kelly et al. |
| 2009/0098419 | A1 | 4/2009 | Eickhoff et al. |

FOREIGN PATENT DOCUMENTS

| | | | |
|---|---|---|---|
| JP | 08067939 | | 3/1996 |
| WO | WO-2005004273 | A2 | 1/2005 |
| WO | WO-2005064227 | A1 | 7/2005 |
| WO | WO-2006005892 | A1 | 1/2006 |
| WO | WO-2006091227 | A1 | 8/2006 |
| WO | WO-2007008893 | A2 | 1/2007 |
| WO | WO-2007055763 | A2 | 5/2007 |
| WO | WO-2007067406 | A2 | 6/2007 |

OTHER PUBLICATIONS

"U.S. Appl. No. 11/789,520, Advisory Action mailed Sep. 30, 2010", 3 pgs.
"U.S. Appl. No. 11/789,520, Appeal Brief filed Jun. 7, 2011", 20 pgs.
"U.S. Appl. No. 11/789,520, Appeal Decision mailed Jun. 21, 2013", 6 pgs.
"U.S. Appl. No. 11/789,520, Decision on Pre-Appeal Brief Request mailed May 10, 2011", 2 pgs.
"U.S. Appl. No. 11/789,520, Examiner Interview Summary mailed Jul. 15, 2013", 2 pgs.
"U.S. Appl. No. 11/789,520, Examiner's Answer to Appeal Brief filed Aug. 15, 2011", 17 pgs.
"U.S. Appl. No. 11/789,520, Final Office Action mailed Feb. 3, 2011", 10 pgs.
"U.S. Appl. No. 11/789,520, Final Office Action mailed Jul. 22, 2010", 12 pgs.
"U.S. Appl. No. 11/789,520, Final Office Action mailed Nov. 18, 2009", 13 pgs.
"U.S. Appl. No. 11/789,520, Non Final Office Action mailed Jan. 28, 2010", 10 pgs.
"U.S. Appl. No. 11/789,520, Non Final Office Action mailed Jun. 25, 2009", 13 pgs.
"U.S. Appl. No. 11/789,520, Non Final Office Action mailed Nov. 24, 2010", 9 pgs.
"U.S. Appl. No. 11/789,520, Pre-Appeal Brief Request filed Mar. 6, 2011", 5 pgs.
"U.S. Appl. No. 11/789,520, Response filed Jan. 4, 2010 to Final Office Action mailed Nov. 18, 2009", 14 pgs.
"U.S. Appl. No. 11/789,520, Response filed Apr. 21, 2010 to Non Final Office Action mailed Jan. 28, 2010", 14 pgs.
"U.S. Appl. No. 11/789,520, Response filed Aug. 16, 2010 to Final Office Action mailed Jul. 22, 2010", 14 pgs.
"U.S. Appl. No. 11/789,520, Response filed Sep. 20, 2010 to Advisory Action mailed Aug. 25, 2010", 15 pgs.
"U.S. Appl. No. 11/789,520, Response filed Sep. 24, 2009 to Non Final Office Action mailed Jun. 25, 2009", 13 pgs.
"U.S. Appl. No. 11/789,520, Response filed Oct. 5, 2010 to Advisory Action mailed Sep. 30, 2010", 15 pgs.
"U.S. Appl. No. 11/789,520, Response filed Dec. 13, 2010 to Non Final Office Action mailed Nov. 24, 2010", 14 pgs.
"U.S. Appl. No. 11/934,011, Non Final Office Action mailed Oct. 1, 2009", 7 pgs.
"U.S. Appl. No. 11/934,011, Notice of Allowance mailed Feb. 17, 2010", 6 pgs.
"U.S. Appl. No. 11/934,011, Response filed Jan. 4, 2010 to Non Final Office Action mailed Oct. 1, 2009", 7 pgs.
"U.S. Appl. No. 11/934,011, Response filed Jul. 16, 2009 to Restriction Requirement mailed Jul. 13, 2009", 7 pgs.
"U.S. Appl. No. 11/934,011, Restriction Requirement mailed Jul. 13, 2009", 6 pgs.
"European Application Serial No. 08166990.5, European Search Report mailed Dec. 3, 2009", 3 pgs.
Mintz, M., et al., "The reaction of hydrogen with magnesium alloys and magnesium intermetallic compounds", Journal of the Less-Common metals, Elsevier-Sequoia S.A Lausanne, CH, vol. 74, No. 2, 263-270 pgs.
Pasaogullari, Ugur, "Liquid Water Transport in Polymer Electrolyte Fuel Cells with Multi-Layer Diffusion Media", Proceedings of IMECE04, 2004 ASME International Mechanical Engineering Congress and Exposition, Anaheim, California, (Nov. 13-20, 2004), 1-9.
Saboungi, M. L, et al., "Computation of isothermal sections of the Al-H—Mg system", Calphad. Computer Coupling of the Phase Diagrams and Thermochemistry, New York, NY, US, vol. 1, No. 3, 237-251 pgs.
Yabe, et al., "Thermal stability and hydrogen absorption/desorption properties of Mg17Al12 produced by bulk mechanical alloying", Journal of Alloys and Compounds, Elsevier Sequoia, Lausanne, CH, vol. 433, No. 1-2, 241-245 pgs.
Zhang, et al., "Hydriding behaviour of Mg17Al12 compound", Materials Chemistry and Physics, Elsevier, vol. 94, No. 1, 69-72 pgs.

* cited by examiner

POWER GENERATOR WITH ADDITIONAL HYDROGEN STORAGE

CROSS REFERENCE TO RELATED APPLICATIONS

The present application is a divisional of and claims the benefit of priority to U.S. application Ser. No. 11/789,520, filed Apr. 25, 2007, which is incorporated herein by reference in it's entirety.

BACKGROUND

In some fuel cell based power generators, hydrogen is extracted from a fuel in the presence of water and then is introduced into a fuel cell to produce electricity. In such generators, hydrogen may leak to ambient even when power is not being drawn from the power generator. As hydrogen is lost, water migrates back to the fuel to replace the water consumed by the reaction that produced the hydrogen. If this process continues, energy may be slowly drained from a power generator, reducing the total energy available from the power generator for useful power generation.

Power generators based on hydrogen generators and proton exchange membrane (PEM) fuel cells may provide higher energy density than conventional power sources like batteries, but may have difficulty in quickly providing pulses of current. They may also be prone to high self discharge, low startup and sensitive to ambient humidity, making them impractical for some applications. Further, high cost of manufacture may have prevented wide commercialization.

Many electronic devices have intermittent and widely varying power requirements from essentially zero to quickly using short pulses of power as high as a few Watts. These power requirements make it difficult to design a commercially feasible fuel cell for a wide variety of applications. Such power sources should have a relatively long shelf life when not in use. It is desirable to increase the energy capacity of current power sources so as to decrease power supply replacement intervals and/or increase operating life, while also reducing the size and weight of the power source.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

An electrical power generator is provided which generates hydrogen gas internally through the reaction of water vapor with a moisture absorbing, solid fuel substance, which hydrogen gas is reacted with atmospheric oxygen from the air at a fuel cell to generate electrical energy. The reaction of hydrogen and oxygen also produces water molecules as a byproduct at the fuel cell. This generated water is passively diffused from the fuel cell as water vapor to a fuel chamber that contains the solid fuel substance, where it reacts with the fuel substance to generate hydrogen gas. A power generator that uses to generate hydrogen the water generated by the fuel cells is said to operate in "waterless" mode, in that the power generator operates without an on-board source of water. In such a waterless mode of operation, the amount of power generated is limited by the amount of water that diffuses from the fuel cell to the fuel.

An additional fuel substance is also contained within the power generator. In one embodiment, it is a metal hydride element that functions as a sort of hydrogen sponge that can quickly adsorb or desorb hydrogen at an almost constant pressure. The electrical energy generated may be used to power large or small devices that are connected to the power generator, depending on the size of the power generator. The power generator of the invention is particularly useful for powering miniature devices such as wireless sensors, cellular phones or other hand held electronic devices that are electrically connected to the anode and cathode of the one or more fuel cells of the power generator.

Figure 1:
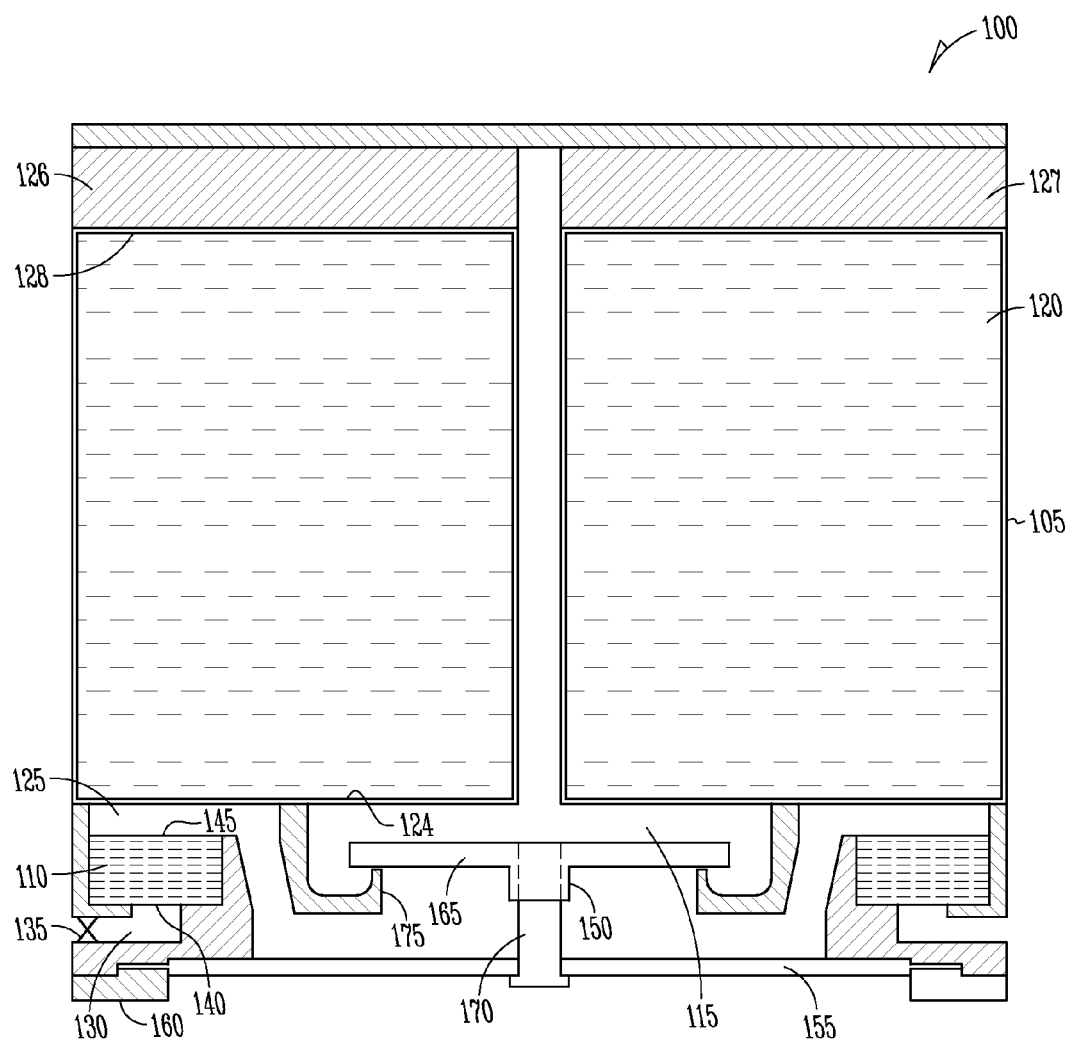
FIG. 1 is a cross-sectional schematic representation of a power generator having a hydrogen storage element according to an example embodiment.

FIG. 1 illustrates a cross-sectional view of an electrical power generator 100. Power generator 100 comprises a housing 105, at least one fuel cell 110 mounted within the housing 105, at a first fuel chamber 115 for storing a fuel substance 120, such as a porous chemical hydride fuel, mounted with the housing 105, and a cavity 125 within the housing 105 extending from the at least one fuel cell 110 to the fuel chamber 115. Cavity 125 admits a flow of hydrogen gas from the fuel chamber 115 to the fuel cell 110, and admits a flow of water vapor from the fuel cell 110 to the fuel chamber 115 across a water vapor and hydrogen permeable membrane 124.

The fuel 120 may include alkali intermetallic compounds as an alternate fuel in place of or in combination with the chemical hydride. Examples include but are not limited Li3Al2, CaAl19, and Mg2Al3 which are commercially available from Alvatec inc. These materials function in a manner similar to chemical hydrides in that they generate hydrogen when exposed to water vapor.

A second fuel chamber 126 includes a hydrogen storage element 127, such as a porous metal hydride hydrogen storage element. In one embodiment, the second fuel chamber 126 is separated from the first fuel chamber by a hydrogen permeable filter 128. Filter 128 may be a particulate filter in one embodiment. The hydrogen storage element 127 functions as a sort of hydrogen sponge that can quickly adsorb or desorb large amounts of hydrogen at an almost constant pressure. This allows the power generator 100 to generate power for long periods of time (hours in some embodiments) at a power level above that which is sustainable with water-less only operation.

Power generators may be designed to generate a wide range of power levels. A power generator with only a chemical hydride fuel operating in waterless mode would need to be designed for the maximum power within the range, which may require a large fuel cell membrane area and result in high cost and high self discharge due to hydrogen permeation through the membrane. A power generator with a fuel consisting of chemical hydride and metal hydride can accommodate pulses of power by using some of the hydrogen stored in the metal hydride, and can thus be designed for the average power of the range, resulting in lower cost and reduced self discharge. Additionally, sensitivity to ambient temperature and humidity may be reduced, because the power generator can draw on the hydrogen stored in the storage element 127 for long periods of time, causing significant self heating and humidification in the fuel cell 110, which may improve performance.

Metal hydride may be chosen as a fuel material for the storage element 127 in one embodiment such that its equilibrium pressure is in the range of approximately 0.01 to 10 atmospheres over an approximately −20 to 60° C. temperature range. Potential metal hydrides include ab5, ab2, ab, complex alloys, intermetallic compounds or solid solution alloys. Specific materials include but are not limited to $LaNi_5$, $LaNi_4.6Mn_{0.4}$, $MnNi_{3.5}Co_{0.7}Al_{0.8}$, $MnNi_4.2CO_{0.2}Mn_{0.3}Al_{0.3}$, $TiFe_{0.8}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, and $LaNi_{4.7}Al_{0.3}$.

Figure 2:
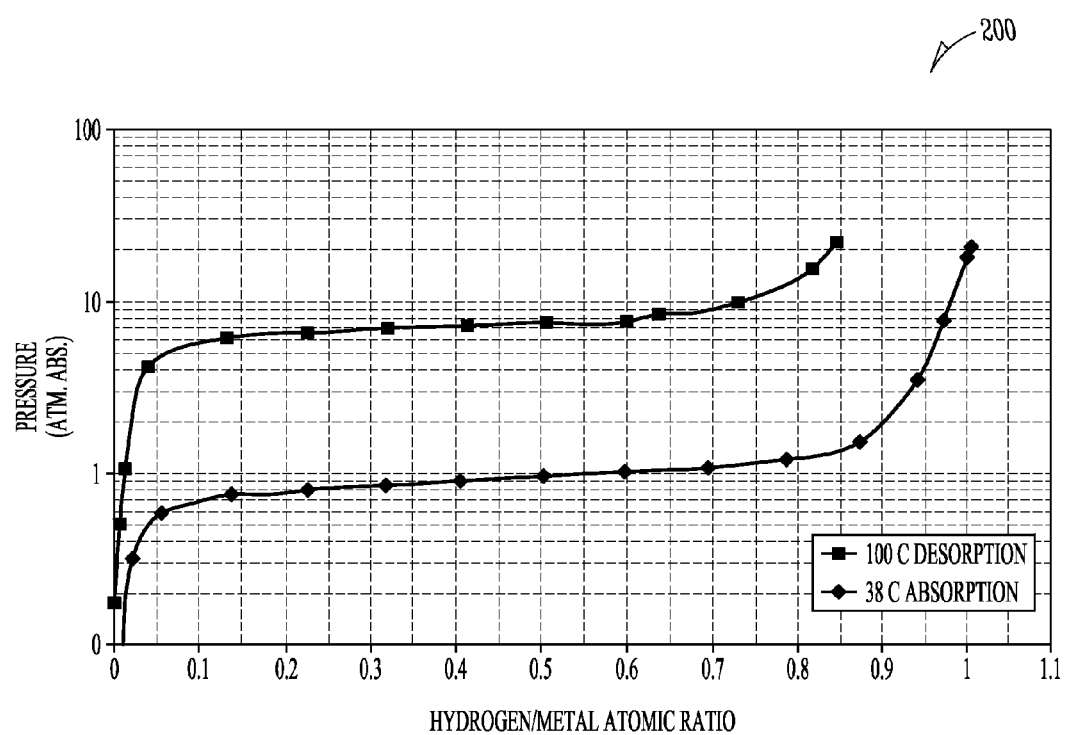
FIG. 2 is a graph illustrating absorption and desorption characteristics of an example metal hydride according to an example embodiment.

Additionally, mixtures of compounds can be used to maintain a constant hydrogen pressure over a range of temperatures. The fuel may also include materials that act as catalysts to improve hydrogen adsorbption/desorption kinetics. Chemical hydrides generate hydrogen via a chemical reation with water. Metal hydrides adsorb and desorb hydrogen, and have an equilibrium hydrogen pressure that is mostly a function of temperature. A graph 200 in FIG. 2 illustrates absorption and desorption characterisics of one example metal hydride, Hy-stor 207 (available from Hera USA Inc. of Ringwood, N.J. 07456) for two different temperatures at various pressures and hydrogen/metal atomic ratios. Hydrogen molecules in metal hydrides dissociate into hydrogen atoms at the surface of the metal hydride and migrate into the interstitial spaces in the crystal lattice.

In operation, fuel cell 110 generates electricity and fuel cell water from the reaction of hydrogen gas and oxygen gas from the air. Atmospheric oxygen enters into the housing 105 through at least one air inlet 130. The oxygen gas then travels to the fuel cell 110 where it reacts with hydrogen gas, generating electricity and water molecules. The type of fuel cell is referred to as a Proton Exchange Membrane (PEM) fuel cell, also known as a Polymer Electrolyte Membrane fuel cell.

In one embodiment, each air inlet 130 may be formed in a shape that is suitable for inclusion of an optional shutoff valve 135. As such, the air inlets 130 may be rectangular or circular in shape, consistent with requirement of mating with the shutoff valve 135. The optional shutoff valve may be operated to shutoff the fuel cell 110 from all ambient water, effectively shutting down the fuel cell and stopping it from producing electricity and using up its fuel when not in use. The valve 135 may be manually operated, or otherwise controlled as desired.

A typical PEM fuel cell 110 comprises an electrolytic membrane positioned between a positive electrode, or cathode 140, on one side of the membrane, and a negative electrode, or anode 145, on the other side of the membrane. In typical hydrogen-air PEM fuel cell behavior, a hydrogen fuel (e.g. hydrogen gas) is channeled through flow field plates to the anode, while oxygen is channeled to the cathode of the fuel cell. At the anode, the hydrogen is split into positive hydrogen ions (protons) and negatively charged electrons. The electrolytic membrane allows only the positively charged ions to pass through it to the cathode. The negatively charged electrons travel along an external circuit to the cathode, creating an electrical current. At the cathode 140, the electrons and positively charged hydrogen ions combine with oxygen to form water molecules.

Power generator 100 allows enough oxygen to diffuse from the ambient air, through the air inlet 130 and to the cathode 140 with only a small pressure drop, e.g. 10% to 20% of the atmospheric oxygen pressure. The power generator may have high hydrogen permeation losses and thus reduced lifetime if operated at high pressures.

The chemical reaction that converts hydrogen and oxygen to water ($2H_2+O_2 \rightarrow 2H_2O$) creates two moles of water for every mole of oxygen it consumes. Further, the diffusivity of water vapor in air and the diffusivity of oxygen in air are similar. Accordingly, the partial pressure difference of water vapor may be roughly twice that of oxygen to maintain equilibrium. The power generator having the above proportions maintains a humidified environment instead of losing the generated water molecules to the atmosphere outside the generator.

Within the cavity 125, on the anode 145 side of the fuel cell 110, a comparatively low humidity region exists due to the moisture absorbing, hygroscopic nature of the fuel substance 120. Accordingly, the water generation and retention at the cathode 140 generates a moisture concentration gradient and a gas pressure differential which causes water molecules to diffuse back through the fuel cell 110, into the cavity 125 and to the fuel chamber 115 in the form of water vapor. This water vapor then reacts with fuel substance 120, generating hydrogen gas. The generated hydrogen gas will then pass through cavity 125 and to the fuel cell anode 145 where it will react with oxygen to once again generate water molecules. Some of the hydrogen may be adsorbed by the storage element 127. This cycle may optionally continue until all of the fuel substance 120 is consumed.

In another embodiment, the power generator 100 may further include at least one valve 150 for regulating the flow hydrogen gas from the fuel chamber 115 to the fuel cell 110, and for regulating the passage of water vapor from the fuel cell 110 to the fuel chamber 115. In one embodiment, valve 150 is a disc positioned between the fuel chamber 115 and the fuel cell 110. In one embodiment, valve 150 comprises a pneumatic valve that is controlled by gas pressure within said cavity 125, pneumatically adjusting the conductance of water vapor to the fuel chamber 115. In one embodiment, valve 150 comprises a pneumatically actuated flexible diaphragm 155 having a periphery that may be fixed to the power generator housing 105 at a support 160; a valve disc 165 is positioned opposite the diaphragm 155; and a rod connector 170 joins the valve disc 165 and diaphragm 155. The valve 150 is in a closed position when the valve disc 165 is in contact with a seal 175, preventing water vapor from reaching the fuel chamber 115. Alternately, the valve is in an open position when the valve disc 165 is separated from seal 175, allowing water vapor to reach the fuel chamber 115 and allowing generated hydrogen gas to reach the fuel cells 110. Seal 175 may comprise a portion of housing 105. Support 160 also may comprise part of housing 105. The fuel cell or fuel cells 110 may also be mounted inside the housing by support 160.

The dimensions of the component parts of the valve may be very small in scale but may vary with respect to the particular application of the valve. The diaphragm thickness and diameter should be within a certain range depending on the desired power output. In one embodiment of the invention, the diaphragm 155 comprises a thin circular plate having a diameter of from about 1 cm to about 3 cm, or from about 1 cm to about 2 cm. The valve disc 165 may have a diameter of from about 0.2 to about 1 cm, or may be from about 0.2 cm to about 0.5 cm. In one embodiment of the invention, the rod connector 170 may comprise a screw or a bolt, but any other means of connecting the diaphragm 155 to the valve disc 165 is suitable such that the valve can alternate between the open and closed positions.

The actuation of the valve may be controlled by the internal gas pressure exerted on the diaphragm 155. As the internal gas pressure of the apparatus rises due to the generation of hydrogen gas, the diaphragm 155 will bend or push outward slightly. This causes the connector to pull the valve disc 165 against the seal 175, closing the valve and preventing the flow of additional water vapor to the fuel chamber 115. With the valve closed, hydrogen production ceases when the water vapor is mostly used up, with excess generated hydrogen being adsorbed by the storage element 127, which can again be used when demand increases if needed. As hydrogen is consumed, such as by fuel cells 110, the internal gas pressure drops, allowing the valve disc 165 to disengage the seal 175 and opening the valve. Accordingly, hydrogen gas is automatically produced at the rate at which it is consumed.

In general, the power generator 100 operates by maintaining a fixed pressure, usually between a few psi below to a few psi above ambient, using the pneumatic valve 150. In one embodiment, generator 100 is able to operate down to low ambient pressures at reduced power output, and up to theoretically unlimited ambient pressures at full power output.

The power generator 100 may be maintained at an operating temperature of from about −40° C. to about 85° C., or in a further embodiment, from about −20° C. to about 50° C., or from about 0° C. to about 50° C. or from about 20° C. to about 50° C. while in use.

For the purposes of this description, the term "water vapor" does not include steam. While "water vapor" and "steam" are both forms of water, each has very different properties and uses. For example, a locomotive can be driven by steam, but will not operate on the water vapor present in humid air, as does the present invention. In and of itself, "water vapor" is the gas of individual water molecules that may form naturally over a body of water at any temperature, including ice, or that may be naturally present in ambient air. It has a low partial pressure, so it contains relatively few water molecules unless the water that forms it is heated. On the other hand, "steam" is made up of tiny hot water droplets produced by heating water to boiling. Steam contains about 100× more water molecules than does water vapor at 15° C., naturally expands with high force and velocity, and large amounts of water can be boiled and transported off as steam. Water vapor is present in everyday air and contains a much smaller number of water molecules than steam or liquid water, and moves very slowly by natural diffusion. Only very small amounts of water can be transported in the form of water vapor. To illustrate, a single drop of water takes typically one hour to evaporate at room temperature, while an entire kettle of water can be boiled into steam in about twenty minutes. Further, a steam powered generator would require a water supply or water source from which steam may be generated. In contrast, the present invention provides an improvement upon the related art by eliminating such a water source. Accordingly, the apparatus and process of the present invention are designed to function at low operating temperatures using water vapor, not at high operation temperatures using steam.

Power generator 100 may optionally further include a restriction united with the air inlet 130, regulating the diffusion of atmospheric oxygen and atmospheric water molecules into the power generator. This restriction also aids in raising the humidity at the fuel cell cathode 16 due to impedance presented to outward diffusion of water vapor produced at the cathode 140. This increased humidity may improve the operation of the fuel cell. The restriction comprises a hydrophobic membrane that is substantially permeable to atmospheric oxygen gas, but substantially impermeable to water vapor, which membrane substantially obstructs the flow of fuel cell water into the atmosphere. Suitable materials for this oxygen permeable, water vapor impermeable membrane having the desired properties include fluoropolymer containing materials such as fluorinated ethylene propylene (FEP), perfluoroalkoxy, and non-fluoropolymer containing materials such as oriented polypropylene (OPP), low density polyethylene (LDPE), high density polyethylene (HDPE) and cyclic olefin copolymers (COCs). One oxygen permeable, water vapor impermeable membrane material comprises fluorinated ethylene propylene.

In various embodiments, fuel 120 may comprise a material in powder, granule or pellet form and may be an alkali metal, calcium hydride, lithium hydride, lithium aluminum hydride, lithium borohydride, sodium borohydride and combinations thereof. Suitable alkali metals non-exclusively include lithium, sodium and potassium. One material for the non-fluid substance is lithium aluminum hydride. The fuel substance may be a solid, porous material that allows for the diffusion of gases and vapors. Further, the fuel may also be combined with a hydrogen generation catalyst to catalyze the reaction of the water vapor and the non-fluid substance. Suitable catalysts include non-exclusively include cobalt, nickel, ruthenium, magnesium and alloys and combinations thereof.

Membrane 124, attached to the housing 105 and juxtaposed with the fuel chamber 115, is permeable to water vapor so as to allow water vapor to pass into the fuel chamber 115 and react with the solid fuel substance, thereby generating hydrogen gas. Membrane 124 is also permeable to hydrogen gas, so as to allow generated hydrogen gas to pass into the cavity 125 and back to the fuel cell 110. Suitable materials for this vapor membrane 124 having such dual properties non-exclusively include porous polymers including fluoropolymers, including expanded-polytetrafluoroethylene (ePTFE) laminates such as expanded Teflon®. Example ePTFE laminates are GORE-TEX® manufactured by W. L. Gore & Associates, Inc. of Delaware, and eVENT®, manufactured by BHA technologies of Delaware.

It should be further understood that while various embodiments have been described, the structures described are not intended to be limiting. Other design variations that perform in a substantially similar manner, i.e. waterless power generators capable of producing useful levels of electricity with hydrogen-oxygen fuel cells including an additional hydrogen storage element are incorporated within the scope of the invention.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:
1. A power generator comprising:
a hydrogen producing fuel;
a metal hydride hydrogen storage element positioned to adsorb and desorb hydrogen produced by the hydrogen producing fuel;
a hydrogen permeable particulate filter disposed between the hydrogen producing fuel and the metal hydride hydrogen storage element; and a fuel cell having a cathode, a proton exchange member, and an anode, the fuel cell positioned between ambient and the hydrogen producing fuel and hydrogen storage element.

2. The power generator of claim 1 and further comprising a pressure regulated valve disposed between the hydrogen producing fuel and the fuel cell, wherein the pressure regulated valve is coupled to a pressure responsive flexible diaphragm.

3. The power generator of claim 2 wherein the pressure regulated valve is coupled to a seat in a closed position when pressure between an anode side of the fuel cell and ambient is above a predetermined level.

4. The power generator of claim 3 wherein the pressure regulated valve is in an open position and allows exposure of the hydrogen producing fuel to the fuel cell when a difference in pressure between the anode side of the fuel cell and ambient is below a predetermined level.

5. The power generator of claim 1 wherein the hydrogen storage element is selected to store hydrogen produced by the hydrogen producing fuel when the pressure in the power generator is above a predetermined value.

6. The power generator of claim 1 wherein the hydrogen storage element is selected to release hydrogen from the hydrogen storage element when the pressure in the power generator is below a predetermined value.

7. The power generator of claim 1 wherein the hydrogen storage element is selected to maintain a temperature dependent constant pressure by adsorbing/desorbing hydrogen as a function of temperature and pressure.

8. A power generator comprising:
a hydrogen producing fuel;
a metal hydride hydrogen storage element separated from the hydrogen producing fuel;
a hydrogen permeable particulate filter disposed between the hydrogen producing fuel and the metal hydride hydrogen storage element; and
a fuel cell having a cathode, a proton exchange member, and an anode, the fuel cell positioned between ambient and the hydrogen producing fuel and hydrogen storage element.

9. The power generator of claim 8 and further comprising a pressure regulated valve disposed between the hydrogen producing fuel and the fuel cell, wherein the pressure regulated valve is coupled to a pressure responsive flexible diaphragm.

10. The power generator of claim 9 wherein the pressure regulated valve is coupled to a seat in a closed position when pressure between an anode side of the fuel cell and ambient is above a predetermined level.

11. The power generator of claim 10 wherein the pressure regulated valve is in an open position and allows exposure of the hydrogen producing fuel to the fuel cell when a difference in pressure between the anode side of the fuel cell and ambient is below a predetermined level.

12. The power generator of claim 8 wherein the hydrogen storage element is selected to store hydrogen produced by the hydrogen producing fuel when the pressure in the power generator is above a predetermined value.

13. The power generator of claim 8 wherein the hydrogen storage element is selected to release hydrogen from the hydrogen storage element when the pressure in the power generator is below a predetermined value.

14. The power generator of claim 8 wherein the hydrogen storage element is selected to maintain a temperature dependent constant pressure by adsorbing/desorbing hydrogen as a function of temperature and pressure.

15. The power generator of claim 1 wherein the hydrogen producing fuel includes a chemical hydride.

16. The power generator of claim 8, wherein the hydrogen producing fuel includes a chemical hydride.

* * * * *